(12) United States Patent
Anderson (10) Patent No.: US 8,424,235 B1
(45) Date of Patent: Apr. 23, 2013

(54) LUMINESCENT FISHING LURE RECHARGER

(76) Inventor: Corey Anderson, Ramsey, MN (US)

(*) Notice: Subject to any disclaimer, the term of this patent is extended or adjusted under 35 U.S.C. 154(b) by 1076 days.

(21) Appl. No.: 11/627,055

(22) Filed: Jan. 25, 2007

(51) Int. Cl.
*A01K 85/01* (2006.01)
*A01K 97/04* (2006.01)

(52) U.S. Cl.
USPC .................................. 43/4; 43/17.6; 43/42.53

(58) Field of Classification Search .............. 43/1, 4, 43/4.5, 17.5, 17.6, 42.32, 42.33, 42.34, 42.53; 362/154
See application file for complete search history.

(56) References Cited

U.S. PATENT DOCUMENTS

| | | | | |
|---|---|---|---|---|
| 4,201,315 A | * | 5/1980 | Chuss et al. | 222/66 |
| 5,178,450 A | * | 1/1993 | Zelensky et al. | 362/154 |
| 5,311,413 A | * | 5/1994 | Farmer et al. | 362/154 |
| 5,388,039 A | * | 2/1995 | Dolph | 362/154 |
| 5,566,494 A | | 10/1996 | Zimmer | |
| 5,575,553 A | * | 11/1996 | Tipton | 362/101 |
| 6,016,623 A | * | 1/2000 | Celestine | 43/61 |
| 6,647,659 B1 | | 11/2003 | King et al. | |
| 6,684,557 B1 | | 2/2004 | Yu | |
| 6,808,286 B1 | * | 10/2004 | Backes et al. | 362/155 |
| 6,922,935 B2 | | 8/2005 | Yu | |
| 6,923,549 B2 | * | 8/2005 | Hoy | 362/101 |
| 7,040,308 B2 | * | 5/2006 | Ciesiun | 124/47 |
| 7,278,417 B2 | * | 10/2007 | Ciesiun | 124/82 |
| 7,290,897 B2 | * | 11/2007 | Schmidt | 362/190 |
| 7,364,318 B1 | * | 4/2008 | Cruze | 362/154 |
| 2004/0134114 A1 | * | 7/2004 | Afshari | 43/4.5 |

* cited by examiner

*Primary Examiner* — David Parsley
(74) *Attorney, Agent, or Firm* — Moore & Hansen, PLLC (57) ABSTRACT

Methods and devices for recharging glow-in-the-dark fishing lures. Devices can include an internal cavity, an external opening into the cavity and a light source projecting into the cavity. Some cavities have an opaque, reflective wall and a light source projecting directly into the cavity. Other cavities have a translucent cavity wall and a light source shining in from outside of the cavity, through the cavity wall, and into the cavity. The light may be activated using a manual switch or an automatic switch which triggers upon detecting the passage of a lure into the cavity or the presence of a lure within the cavity. One such lure detector includes a weight sensitive electrical switch. Devices may resemble hand held mugs with handles or may be flange mounted into through-holes in boats decks.

24 Claims, 7 Drawing Sheets

LUMINESCENT FISHING LURE RECHARGER

FIELD OF THE INVENTION

The present invention is related generally to fishing equipment. More specifically, the present invention is related to devices and methods for recharging glow-in-the-dark fishing lures.

BACKGROUND

Fishing lures have continuously evolved as new and better ways to catch fish have been developed. Shiny metallic parts have often been used to catch the attention of fish. More recently, lighted lures have been used; often having self contained batteries and light bulbs or LEDs. Such lures do not require sunlight to reflect, can be used in deep water, and can be used between dusk and dawn, when the sky is dark. Such features have added complexity to lures, with the self-contained power and light source requirements.

Glow-in-the-dark fishing lures have more recently become available, having luminescent materials and/or coatings which glow-in-the-dark after exposure to light. The recharging light source is often provided ad hoc, such as shining a flashlight on the lure while the lure is still on the fishing line since removing the lure and reattaching it would be quite bothersome. Shining the light on the lure may require the use of both, often wet, hands in a rocking boat, and may waste much of the light aimed in the general direction of the lure.

A method and apparatus for quickly recharging a glow-in-the-dark fishing lure is needed, and preferably without a need for the fisherman holding either the lure or the light source.

SUMMARY

The present invention provides an apparatus for recharging a glow-in-the-dark fishing lure. Embodiments of the invention can include a cavity within a cavity wall, an external opening into the cavity, and at least one light disposed to project light primarily into the cavity. The light source may be solid state, LED, strobe, incandescent, ultraviolet, and the like. In some embodiments, the cavity has a volume between about 10 and 100 cubic inches, or 5 and 200 cubic inches. The apparatus may also have a lure detector for detecting the admission and/or presence of the lure in the cavity, as well as a light controller operably coupled to the lure detector. The lure detector can be responsive to the presence and/or admission of the lure, such that the light is turned on responsive to the presence of the lure. The lure detector may be selected from the group consisting of motion sensors, light detectors, weight detectors, load cells, photocells, sound detectors, metal detectors, weight responsive lever arms, proximity switches, electrical contacts, and combinations thereof. Some embodiments also include a lid for at least substantially covering the cavity external opening.

In some embodiments of the invention, the cavity has a bottom portion and a weep hole in communication with the cavity bottom portion. The cavity wall may be substantially internally reflective, with the light projecting from within the cavity. In some devices, the cavity wall is substantially transparent to light and the light projects into the cavity from outside of the cavity through the substantially transparent cavity wall.

Some embodiments of the cavity walls have a bottom portion and a top portion, where the bottom portion is pivotally coupled to the top portion and moves responsive to the presence of the lure resting on the bottom portion. The bottom portion may be operably coupled to a light switch to turn on the light responsive to the presence of the lure weight on the bottom portion. At least one electrical battery powering the light is present in some devices according to the present invention.

Some embodiments of the invention include a neck or throat portion leading from the external opening to the cavity portion. Some embodiments have a handle coupled to an external surface of the device. Some devices having an external handle have the handle configured similar to a coffee cup handle, which may be sized to receive at least the four fingers of an adult hand. One embodiment includes a flange for disposing the device through a hole in a surface and securing the flange to the surface. Such devices can be mounted through holes in boats decks or gunnels.

The present invention also provides methods for recharging a glow-in-the-dark fishing lure. One method includes inserting the glow-in-the-dark fishing lure into a cavity interior in a device, and illuminating the lure in the cavity by shining a light into the cavity. The method may include projecting the light into the device cavity interior from outside of the cavity interior, where the light is fixed to the device. In some methods, the light is fixed to the device and the illuminating includes projecting light into the device cavity interior from within the cavity interior. The light illuminating is responsive to activating a switch in some methods. The switch activating may be automatically activated in some methods by depositing the lure into the cavity. The cavity has a floor in some devices, and the depositing can include allowing the lure to land on the floor. The cavity has a wall substantially transparent to light in some devices, where the illuminating includes shining the light through the wall into the cavity.

DESCRIPTION OF THE DRAWINGS

In the drawings described below, the corresponding reference numerals and letters indicate corresponding parts of the various embodiments throughout the several views, and the various embodiments generally differ only in the manner described and/or shown, but otherwise include corresponding parts.

DETAILED DESCRIPTION

Figure 1:
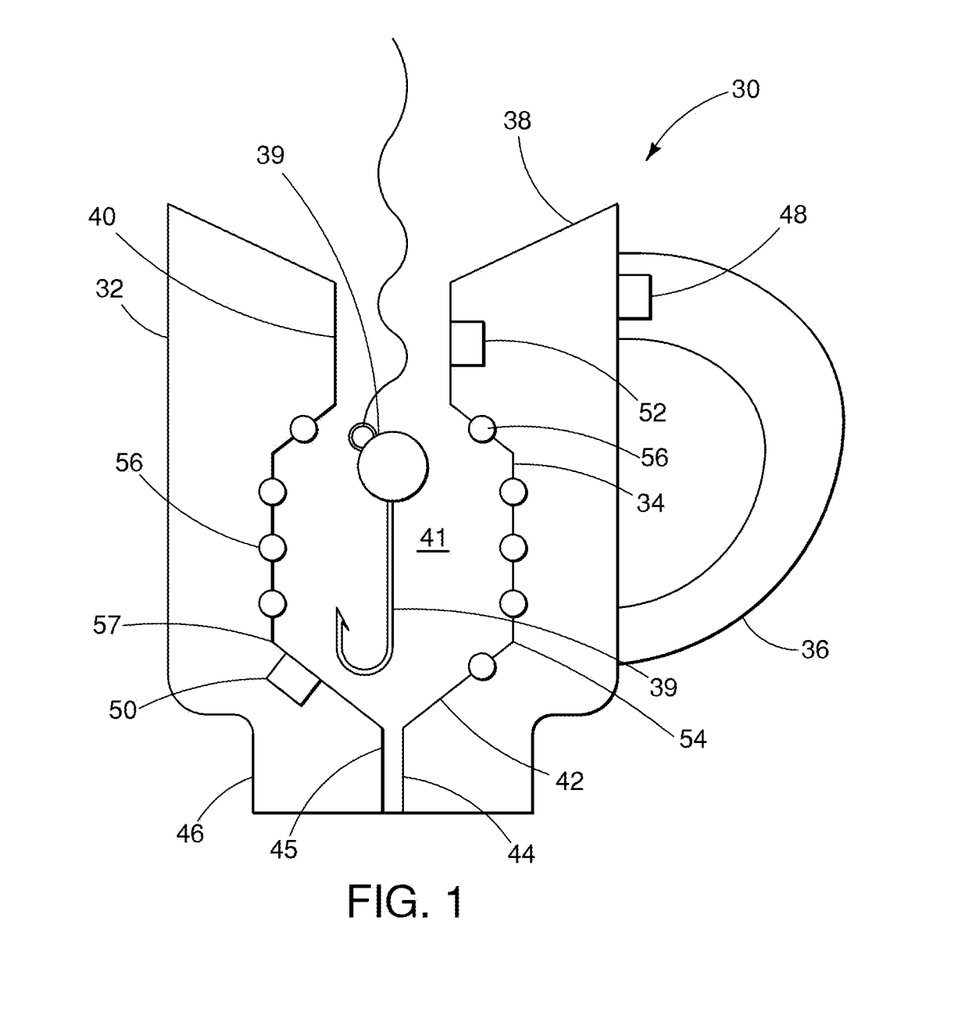
FIG. 1 is a cross-sectional, schematic view of a lure-charging device.

FIG. 1 illustrates a fishing lure recharger 30 including an outer wall 32, an inner wall 34, and inlet side funnel wall 38, and a handle 36. This embodiment of the invention is a portable cup-like unit, which can be rested in a standard size cup holder, in some variations. Lure recharging device 30 also includes a narrowed throat region 40 that leads to the inner wall that includes a downwardly-facing region that widens into a cavity region 41, which, in turn, leads to a bottom region 42 having an upwardly facing region. The throat region 40 has a cross-sectional area, usually the area of a plane that is transverse to the longitudinal axis of the throat. Cavity 41 has an internal wall surface area. The throat cross-sectional area is less than about 5 percent or 10 percent of the cavity wall surface area, in various embodiments of the invention. Bottom region 42 has a weep hole 45 extending downward through a drainage channel 44 to allow water to exit the unit. Outer wall 32 extends downward to a narrow region 46 which can be dimensioned to fit within a standard cup holder diameter. The interior of cavity 41 can have at least one light 56 inserted into cavity wall 34 for projecting light into the cavity. In some embodiments, lights may be positioned in the downwardly and upwardly facing regions so that they are able to project light towards each other. A rechargeable fishing lure 39 may be seen disposed within cavity 41 to be recharged by the inwardly projecting light or lights within cavity 41. Such units may generally have an on/off or activating switch 48 and a lure detection unit 50. Some units may have a lure passage detector 52 disposed above the region where the lure would be expected to reside.

Cavity bottom region 42 can include lure detector 50 in various configurations in various embodiments. In some embodiments, bottom portion 42 is pivotally mounted to the cavity upper portion at 54, allowing some travel or gap formation at 57, when lure 39 is disposed on cavity floor 42. Thus, the presence of lure 39, through its weight, can urge bottom portion 42 downward, allowing the gap at 57 to open, triggering a lure detector. In some embodiments, the pivot point 54 may be counter balanced, biasing gap 57 to a closed configuration. In other embodiments, bottom portion 42 is spring biased in a closed position, where the spring bias is partially overcome by the weight of a present lure, thereby closing a switch to indicate the presence of a lure within the cavity. In some other embodiments, lure detector 50 can include light sensors, sound sensors, or other proximity detection sensors for detecting the presence of a lure within the cavity. Lure detector 50 can utilize a light beam interruption principle in some devices, and motion detection in other devices. In some embodiments, lure passage detector 52 is included, to detect the entering of lure 39 through throat 40. Such a passage detector can be used to turn on the lure recharging lights 56 into an illuminating state for a time period. Such a passage detector can include, in various embodiments, a light detector or a motion detector.

In some devices, internally contained batteries are included and are removably but securely attached to device 30. In some embodiments of the invention, the batteries are disposed between outer shell 32 and inner shell 34. In other embodiments, an external power source may be used, for example, clips for an external battery or a plug-in connector for a cigarette lighter-type adapter.

Lights 56 may take different forms in different embodiments of the invention. 12-volt incandescent lights may be used in certain embodiments. In other embodiments, LED's, for example visible light LED's and/or ultra violet LED's may be used to project light into cavity 41. In some other embodiments, a camera-type high voltage strobe light may be used, coupled to photo flash-type circuitry. Such photoflash circuits and the associated so-called "strobe" tubes are well known. One such circuit is shown for purposes of illustration in FIG. 8. The charging and strobe discharge may be triggered by a manual switch, for example, switch 48, or by lure detector 52. Some devices include a controller having a power switch providing the power or the indication to turn on the device. The controller can also have a lure detector as an input as well as a power control output e.g. power to a relay, to turn on power to the lights. The controller may also include a timer to provide the light for a predetermined time period. The controller may control the photoflash circuitry in embodiments having such functionality.

In some devices, the lure is dropped into device 30, and with the passage of the lure, the presence of the lure, and/or the manual activation of a switch, the internally disposed recharging light is activated for a time period. This time period may last as long as the lure is in the cavity, or last for a fixed time period from the initial activation. Devices having a photoflash light may charge, and then flash.

The circuitry for the various embodiments, given the teachings of the present invention, would be easily implemented by one skilled in the art. In one embodiment, lure detection unit 50 operates as a normally open switch (with no lure present) which is coupled in series between a power source and a light source, such that the light is activated when the lure is present. In another embodiment, lure detection unit 50 operates as a switch wired in series with a light source, a power source, and a controller circuit including a timer. A change in state indicating the new presence of the lure can start the timer which activates the light source for a preset time period. In yet another embodiment, the controller begins charging a photoflash circuit, which when charged, causes a strobe tube to flash.

Figure 2:
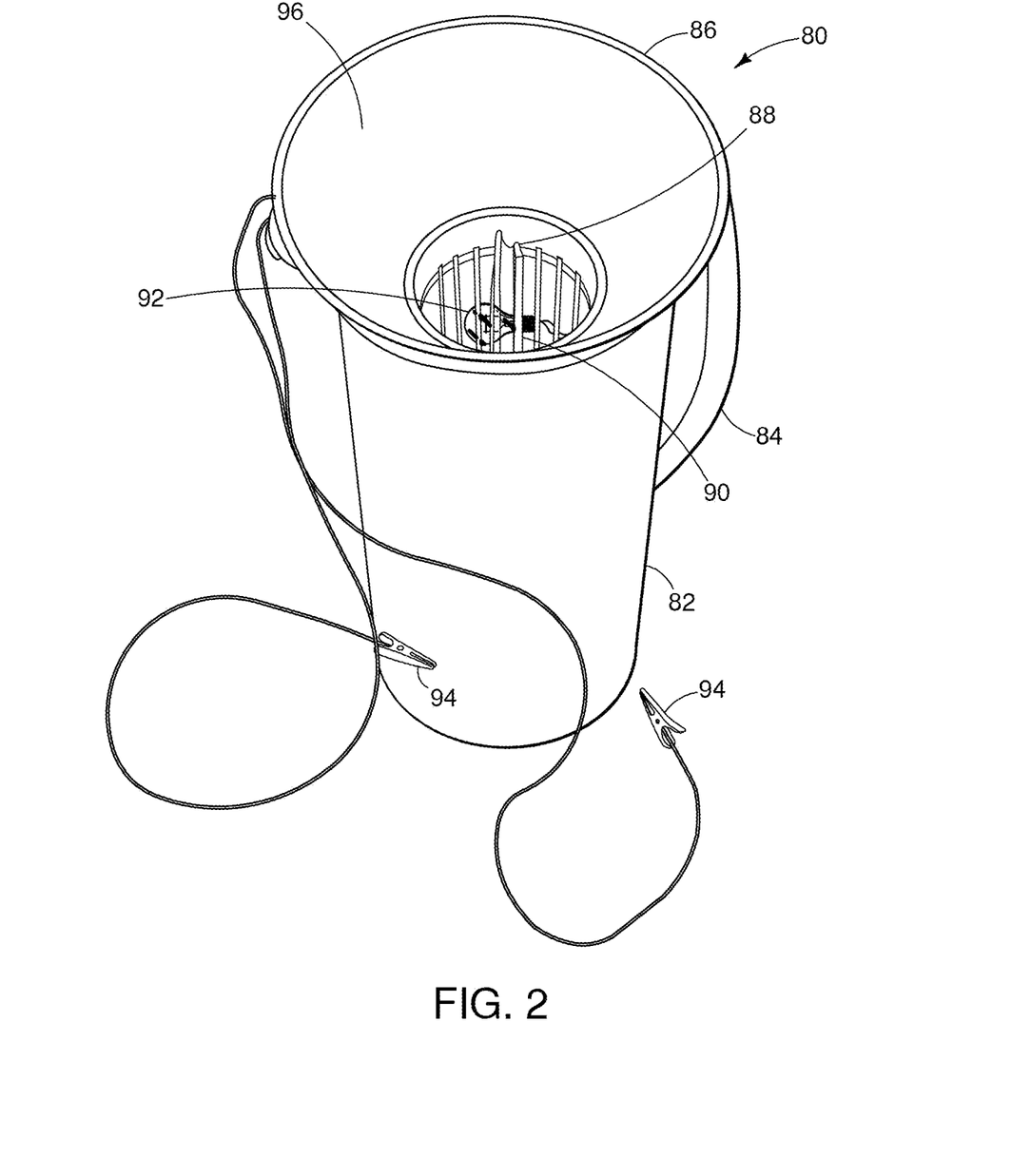
FIG. 2 is a perspective view of a lure-charging device energized by a pair of power source through an alligator clip terminated wires.

FIG. 2 illustrates another lure recharging device 80 having generally an external body 82, a handle 84, and a top 86. A funnel or introducer region 96 leads down into a cavity 88. Cavity 88 includes a generally transparent side wall 92 having a plurality of vertically extending and spaced apart ribs. These ribs can be formed of a translucent, plastic material in some embodiments. The transparent side wall for the cavity allows light to pass through the side wall. As used herein, the term "transparent" means that the material allows a sufficient amount of light to pass through the material to recharge the glow-in-the-dark lure, and includes a translucent wall as long as sufficient light can pass through the wall. In this embodiment, light is provided by a light bulb 90, disposed within external wall 82 and outside of side wall 92. In this embodiment, power was provided from a power source through a pair of wires 94 terminated by alligator clips.

Figure 3:
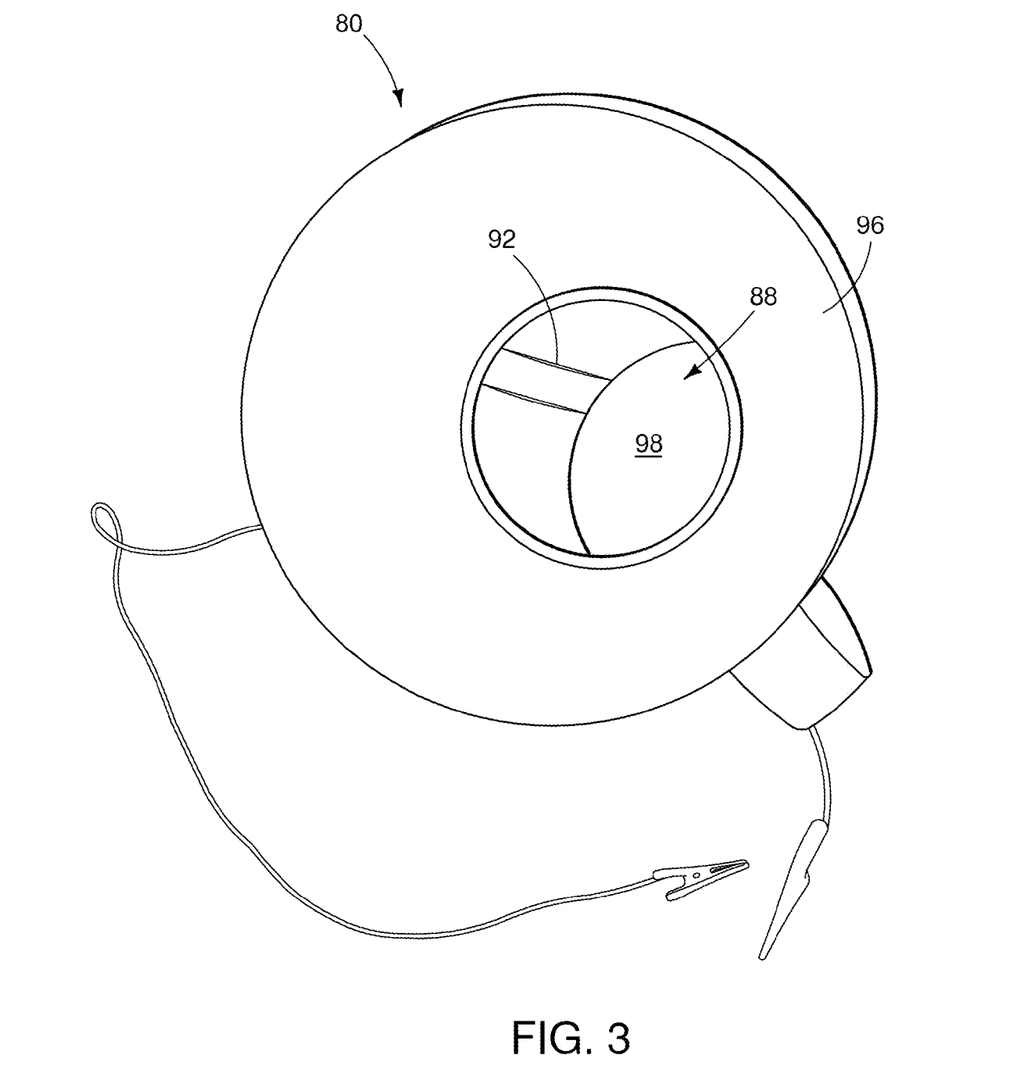
FIG. 3 is a top, perspective view of the device of FIG. 2, showing the cavity side walls within.

FIG. 3 illustrates device 80 from the top, showing the funnel region 96, cavity 88, side walls 92, and a bottom region 98. In some devices, bottom region 98 includes a weep hole through the bottom and in communication with the outside of the device, to allow water to pass through the device rather than build up. In some embodiments, having open side walls, the water can run off the sides and out of the bottom of the device.

Figure 4:
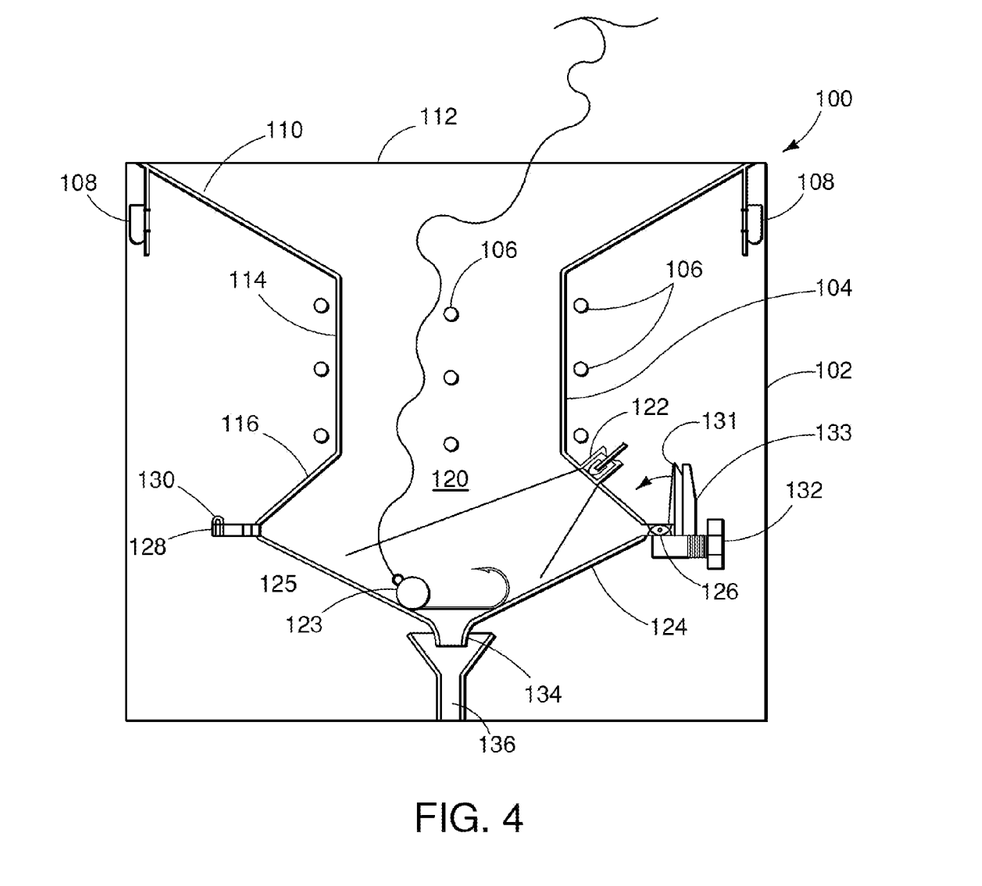
FIG. 4 is a schematic, cross-sectional view of another lure recharging device having a bottom, lure-retaining portion that is pivotally coupled to the upper portion to sense a weight change through movement of the bottom portion to trigger the light charging process.

FIG. 4 illustrates yet another embodiment 100 of the invention, having an outer wall 102, and a transparent inner wall 104 forming a cavity 120. A plurality of lights 106 is disposed around inner wall 104. The lights can be disposed within the cavity, protrude through the cavity inner wall, or in other embodiments, be disposed on the outside of the cavity wall isolated from the cavity and from the fishing lure and shine inward through the transparent wall. Embodiment 100 extends from a top region 112, through a constriction or narrowing funnel region 110, and into throat region 114.

Throat region 114 extends further downward into a wide region 116 forming a major portion of cavity 120. Another light 122 may be seen aiming its light downward into cavity portion 120. A lure 123 may be seen resting on a bottom portion 124 of embodiment 100. The generally round portion as shown in lure 123 represents generally the luminescent portion of the lure. Lures of all types may have the luminescent material, for example, artificial minnows and the like. Bottom portion 124 may be pivotally or hingedly mounted to upper portion 116 as indicated at 126. This pivotal or hinged mounting disposition of bottom portion 124 can allow a gap to form at opposite region 128. In some embodiments, the distance between the bottom portion 124 and portion 116 can vary at region 128 between essentially 0 and ¼ of an inch. Bottom portion 124 can be biased to remain in an upward, closed position.

In some embodiments, this biasing is accomplished using a counter weight 132. In other embodiments, springs (e.g. tension springs, compression springs, resilient jawed clips) may be disposed about the circumference between bottom portion 124 and upper portion 116, which may be overcome by the weight of a lure within. In the illustrated embodiment, lure 123 overcomes the counterweight 132 bias, forcing down bottom portion 124 and increasing the gap at 128 to trigger a switch 130. In some embodiments, the lure detection weight operated switch is located near the counter weight, indicated by opposed electrical contact jaws 131 and 133. When the lure is present, contact jaw 133 may arc leftward to close the contact with contact jaw 131, as indicated on the drawing. In such embodiments, contact jaws 131 and 133 may normally be apart, with the jaws forced into contact by the weight of the lure overcoming a bias to remain apart.

Switch 130 will trigger the activation of lights 106 and 122 to shine within the cavity onto lure 123. Lure 123 may be seen resting atop a weep hole 134, which can conduct any water out a drain 136 and out of embodiment 100. The outer wall 102 of embodiment 100 can be formed of various materials. In some embodiments, a light reflective coating or a silver-like reflective coating or surface can be used to aid in the containment of light within walls 102, allowing the light to bounce off of the walls and on to lure 123. A Mylar light reflective film may be used in some embodiments of the invention. The funnel region 110 can be joined to outer shell 102 using a seal at 108 to maintain the integrity of the region between the inner and outer walls.

Figure 5:
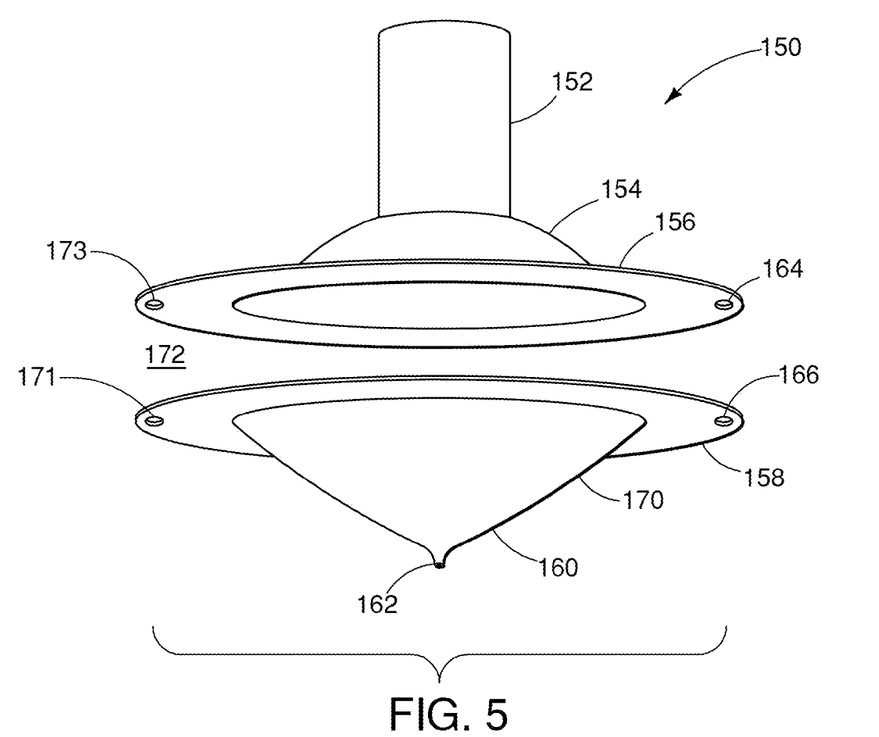
FIG. 5 is a perspective, exploded view of the cavity portion of another lure recharging device joined together by a pivot coupling portion and a travel sensing switch opposite the pivot.

FIG. 5 illustrates another embodiment of the invention, showing a device subassembly 150, but not showing an outer container. Subassembly 150 includes a throat region 152, an expanding or widening region 154, and an upper portion flange 156. A similar lower portion 170 having a flange 158 may be seen including another narrowing region 160 and weep hole 162. Various biasing mechanisms may be used to bias the two portions together to close gaps 171 and 173. Spring tension clips or other springs may urge the two portions together to close gaps 171 and 172, in some embodiments. Other biasing mechanisms are well known to those skilled in the art.

Figure 6:
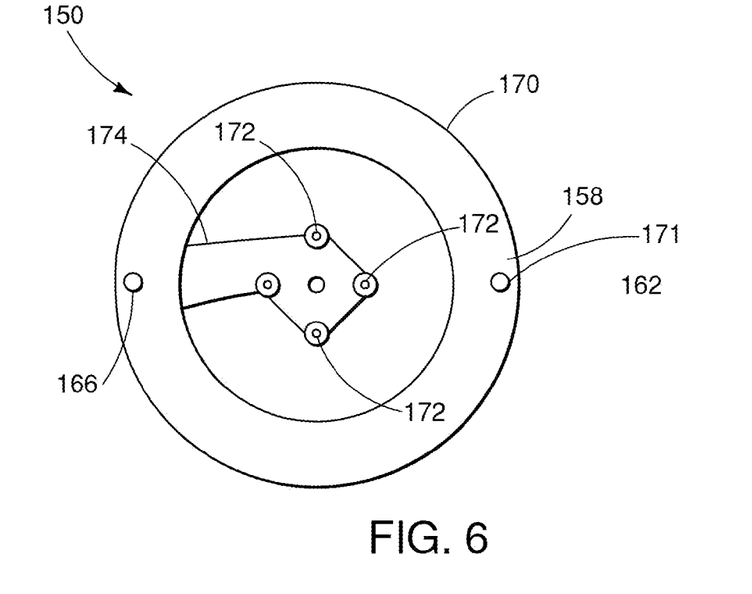
FIG. 6 is a top view of the bottom-most portion of the device of FIG. 5, showing four lights mounted in the bottom portion.

FIG. 6 illustrates embodiment 150 from the top, then showing lower portion 170 and lower flange 158. A series of lights, for example, LEDs, may be seen at 172 connected by a pair of wires 174. Wires 174 may be viewed as a single wire wiring the lights in series, or as a pair wires, wiring the lights in parallel. The lights can best reflect within the cavity illustrated in FIG. 5. The gap shown in FIG. 5 at 171 and/or 173 can be used to trigger a lure detection switch when a lure forces the opening past a limit, to overcome any bias to close the gap.

Figure 7:
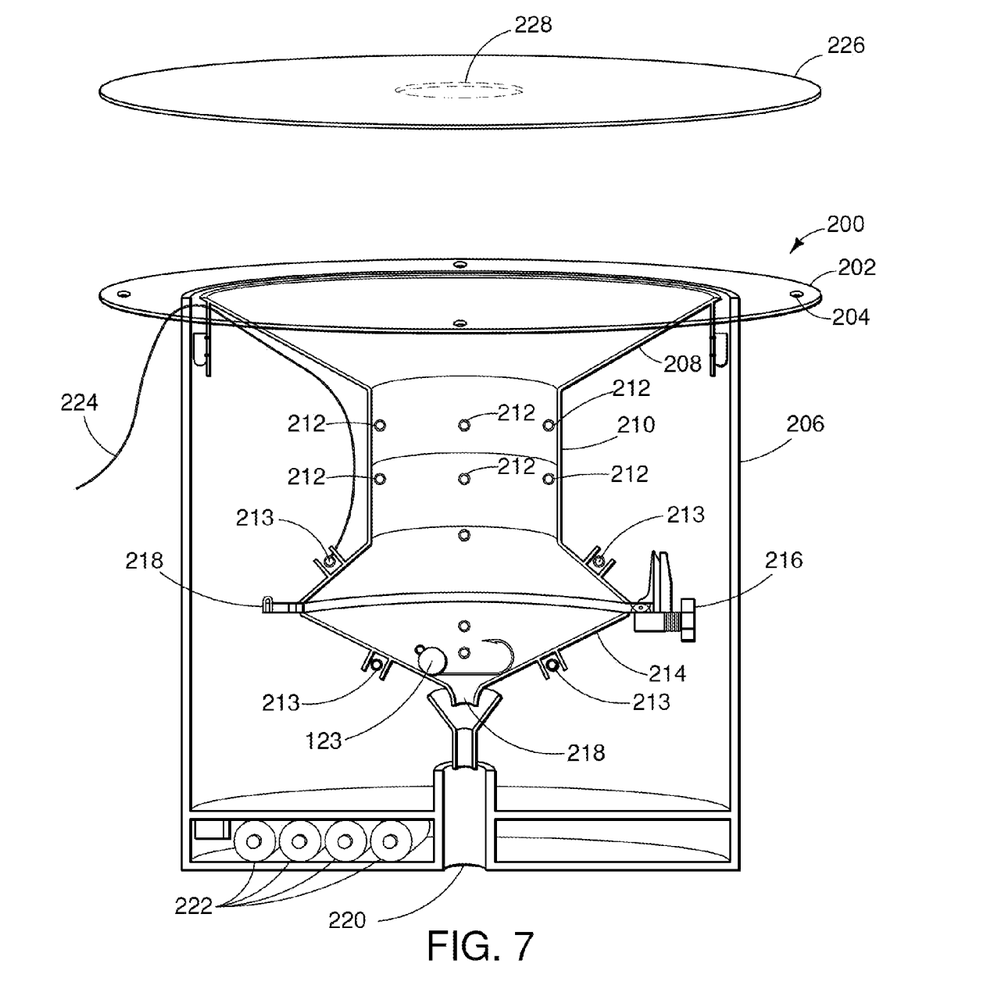
FIG. 7 is a cut away view of yet another lure recharging device for permanently mounting in a boat, gunnel, or deck. This device includes internal batteries and an external power cord, as well as the upper flange for mounting to the gunnel and a top cover for covering the funnel region.

FIG. 7 illustrates another embodiment 200 of the invention, in a boat mountable version. Embodiment 200 includes an upper mounting flange 202 having mounting holed 204 and attached to an outer housing 206. Outer housing 206 can be disposed within a hole formed in a gunnel or other surface of a boat deck, allowing upper flange 202 to rest on the deck and outer housing 206 to drop through the hole in the gunnel or deck. As previously discussed with respect to other embodiments, a funnel region 208 extends to a throat region 210 having a plurality of lights 212 positioned outside and around the throat. As with previous embodiments, the throat region 210 leads to the inner wall that includes a downwardly-facing region that widens into a cavity region which, in turn, leads to a bottom portion 214 having an upwardly facing region. Lights 213 may be positioned in the downwardly and upwardly facing regions so that they are able to project light towards each other. Both lights 213 and 212 may not be present in all embodiments, but could be in some devices. Bottom portion 214 is present for detecting the presence of a lure within through the mutual operation of a counterweight 216 and movement detection switch 218, as previously described.

In embodiment 200, a weep hole 217 may be seen extending to channel 220. A battery compartment 222 may also be seen, for powering the device internally. Alternatively the device can be powered by the boat's battery. A cover 226 may also be seen, having a central aperture 228 therethrough. Cover 226 can be used to cover substantially most of the opening into funnel 208 yet be sufficiently large to allow placement of the appropriate lure into the lighting device.

Figure 8:
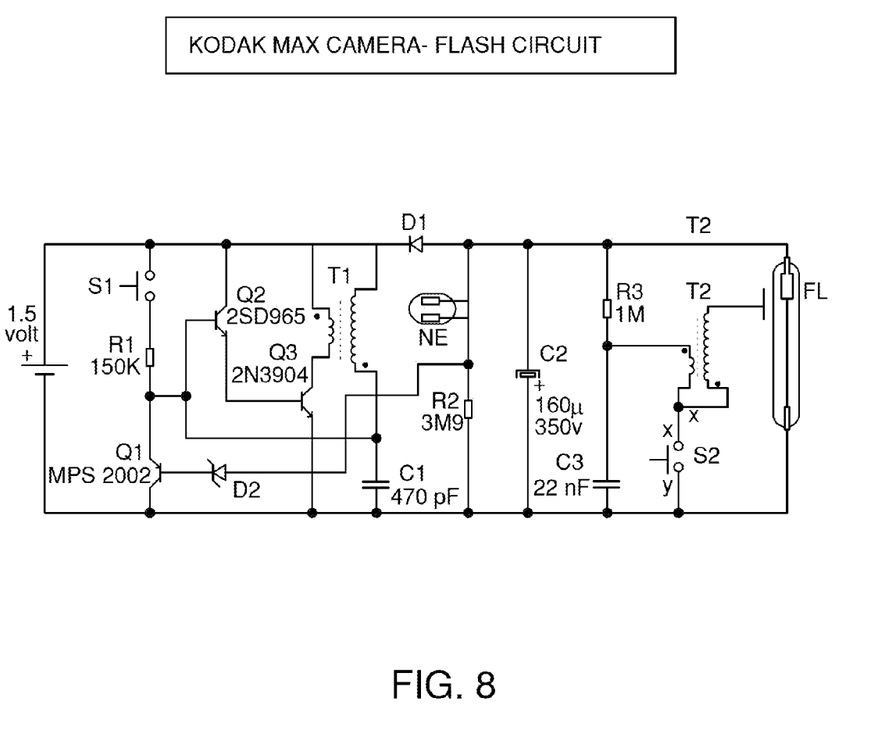
FIG. 8 is a schematic of a circuit diagram for charging and discharging a photoflash tube.

FIG. 8 is a circuit diagram of a photoflash circuit. A photoflash circuit can be used in some embodiments to charge and discharge a flash tube to quickly recharge the lure. Switch S1 can be used to charge the capacitor and S2 used to discharge the capacitor across the flash tube.

Although the preferred embodiments of the present invention have been described herein, the above description is merely illustrative. Further modifications of the invention herein disclosed will occur to those skilled in the respective arts and all such modifications are deemed to be within the scope of the invention as defined by the appended claims.

What is claimed is:

1. An apparatus for recharging a glow-in-the-dark fishing lure, the apparatus comprising:
   a wall having an inner surface and an outer surface, with the inner surface defining a lure receiving cavity with a bottom and a top portion, wherein the top portion includes an inwardly extending annulus that defines an upwardly facing external opening, with the lure receiving cavity having a cross-sectional dimension and with the external opening comprising a generally cylindrically-shaped throat with a vertically oriented longitudinal axis, opposed, open ends and a cross-sectional dimension, wherein the cross-sectional dimension of the throat is smaller than the cross-sectional dimension of the cavity, and wherein the cross-sectional dimension of the throat is large enough to freely permit passage of the fishing lure therethrough as the fishing lure is positioned into and removed from said lure receiving cavity, and wherein the bottom includes a weep hole with a cross-sectional dimension, wherein the cross-sectional dimendimension of the throat, and wherein the weep hole allows liquid to freely drain from the bottom of the cavity and completely out of the apparatus; and at least one light source located adjacent the cavity and positioned so as to be able to illuminate the interior of the cavity and the fishing lure positioned therein.

2. The apparatus of claim 1, further comprising a switch, the switch operatively connected to the light and configured to be actuated by the lure such that when the lure is positioned in the cavity the light is energized, and when the lure is removed from the cavity the light is deenergized.

3. The apparatus of claim 1, wherein the bottom is generally concave.

4. The apparatus of claim 1, wherein one end of open ends of the throat further comprises an outwardly opening, upwardly-facing funnel-shaped region.

5. The apparatus of claim 1, further comprising: an outwardly extending flange, with the flange having an upper surface that is substantially perpendicular to the longitudinal axis of said throat, and a lid that is removably attachable to the apparatus so as to substantially cover the upper surface of the flange and the external opening, with the lid having an aperture therethrough, and with the aperture of the lid having a cross-sectional dimension that is smaller than the cross-sectional dimension of the throat and larger than the cross-sectional dimension of the weep hole.

6. The apparatus of claim 1, wherein the light source comprises a plurality of light sources, wherein the light sources are removably attached to the inner surface of the wall of the cavity in a spaced-apart relation.

7. The apparatus of claim 1, wherein the light source comprises a plurality of LEDs, and wherein the LEDs are positioned within the cavity defined by the wall such that they are able to project light upwardly and downwardly towards each other.

8. The apparatus of claim 1, wherein at least a portion of the wall comprises light reflective material.

9. The apparatus of claim 1, wherein the light source comprises a plurality of LEDs, and wherein the LEDs are positioned so that they are adjacent the outer surface of the wall, the LEDs arranged so that they are able to project light upwardly and downwardly through the wall and towards upper and lower surfaces within the cavity.

10. The apparatus of claim 9, wherein at least those portions of the wall adjacent the LEDs comprises light-transmissive material, and wherein illumination produced by the LEDs passes through the light transmissive material into the cavity.

11. The apparatus of claim 1, wherein the cavity further comprises a top portion, wherein the bottom is movably coupled to the top portion so as to form a switch, and wherein the switch is operatively connected to the light and configured to be actuated by the lure such that when the lure is positioned on the bottom, the bottom moves to complete a circuit and the light is energized, and when the lure is lifted off the bottom, the bottom moves and breaks the circuit and the light is deenergized.

12. The apparatus of claim 1, further comprising an outer shell having a bottom and a sidewall, with the outer shell defining an interior configured to receive and substantially encase the wall and light of the apparatus positioned therein.

13. The apparatus of claim 12, wherein the bottom of the outer shell has a hole therethrough, with the hole in communication with a weep hole located in the bottom of the cavity.

14. The apparatus of claim 1, further comprising a detector that senses the presence of a lure in the throat.

15. The apparatus of claim 4, wherein the outwardly opening, upwardly-facing funnel-shaped region has a cross-sectional dimension that is greater than the cross-sectional dimension of the lure receiving cavity.

16. The apparatus of claim 1, wherein the light source comprises a plurality of discrete light sources, and wherein some of the light sources are positioned adjacent to and along the length of the throat in a spaced-apart relation.

17. The apparatus of claim 12, wherein the shell further comprises an outwardly extending flange, with the flange having a lower surface that is substantially perpendicular to the longitudinal axis of said throat, with the lower surface configured to be able to engage a support and maintain the apparatus in an elevated, upright position.

18. The apparatus of claim 1, wherein the outer surface of the wall includes an upper portion having a cross-sectional dimension, an inwardly extending transverse portion that defines a lower surface, and a lower portion having a cross-sectional dimension that is smaller than the cross-sectional dimension of the upper portion, wherein the lower surface is configured to engage a support and maintain the apparatus in an elevated, upright position.

19. The apparatus of claim 18, wherein one end of open ends of the throat further comprises an outwardly opening, upwardly-facing funnel-shaped region.

20. The apparatus of claim 11, further comprising a counterweight operatively connected to the bottom, wherein the counterweight biases the bottom upwardly against the top portion.

21. An apparatus for recharging a glow-in-the-dark fishing lure, the apparatus comprising:

a wall having an inner surface and an outer surface, with the inner surface defining a lure receiving cavity with a bottom and a top portion with an inwardly extending annulus that defines an upwardly facing external opening, with the lure receiving cavity having a cross-sectional dimension and with the external opening comprising a generally cylindrically-shaped throat with a vertically oriented longitudinal axis, opposed, open ends and a cross-sectional dimension, wherein the cross-sectional dimension of the throat is smaller than the cross-sectional dimension of the cavity, and wherein the cross-sectional dimension of the throat is large enough to freely permit passage of the fishing lure therethrough as the fishing lure is positioned into and removed from said lure receiving cavity;

at least one light source located adjacent the cavity and positioned so as to be able to illuminate the interior of the cavity and the fishing lure positioned therein; and an outer shell having a bottom and a sidewall, with the outer shell defining an interior configured to receive and substantially encase the wall and light of the apparatus positioned therein, the shell further comprising an outwardly extending flange, with the flange having a lower surface that is substantially perpendicular to the longitudinal axis of said throat, with the lower surface configured to be able to engage a support and maintain the apparatus in an elevated, upright position.

22. An apparatus for recharging a glow-in-the-dark fishing lure, the apparatus comprising:

a wall having an inner surface and an outer surface, with the inner surface defining a lure receiving cavity with a bottom and a top portion, with the top portion including an inwardly extending annulus that defines an upwardly facing external opening, with the lure receiving cavity having a cross-sectional dimension and with the external opening comprising a generally cylindrically-shaped throat with a vertically oriented longitudinal axis, opposed, open ends and a cross-sectional dimension, wherein the cross-sectional dimension of the throat is smaller than the cross-sectional dimension of the cavity, wherein the cross-sectional dimension of the throat is large enough to freely permit passage of the fishing lure therethrough as the fishing lure is positioned into and removed from said lure receiving cavity, wherein the a top portion further comprises a downwardly-facing expanding region with a flange having a downwardly facing lower surface, wherein the bottom comprises an upwardly-facing expanding region with a flange having an upwardly facing upper surface, and wherein downwardly and upwardly facing flange surfaces are configured and arranged to be operatively connected to each other; and at least one light source located adjacent the cavity and positioned so as to be able to illuminate the interior of the cavity and the fishing lure positioned therein.

23. The apparatus of claim 22, wherein the light source comprises a plurality of light sources, wherein the bottom is concave and includes a self-draining weep hole, and wherein at least one of the light sources is attached to the bottom, adjacent the weep hole.

24. An apparatus for recharging a glow-in-the-dark fishing lure, the apparatus comprising:

a wall having an inner surface and an outer surface, with the inner surface defining a lure receiving cavity with a bottom and a top portion with an inwardly extending annulus that defines an upwardly facing external opening, with the lure receiving cavity having a cross-sectional dimension and with the external opening comprising a generally cylindrically-shaped throat with a vertically oriented longitudinal axis, opposed, open ends and a cross-sectional dimension, wherein the cross-sectional dimension of the throat is smaller than the cross-sectional dimension of the cavity, and wherein the cross-sectional dimension of the throat is large enough to freely permit passage of the fishing lure therethrough as the fishing lure is positioned into and removed from said lure receiving cavity; and a plurality of discrete light sources located adjacent the cavity and positioned so as to be able to illuminate the interior of the cavity and the fishing lure positioned therein, wherein at least some of the light sources are positioned adjacent to and along the length of the throat in a spaced-apart relation.

\* \* \* \* \*